UNITED STATES PATENT OFFICE.

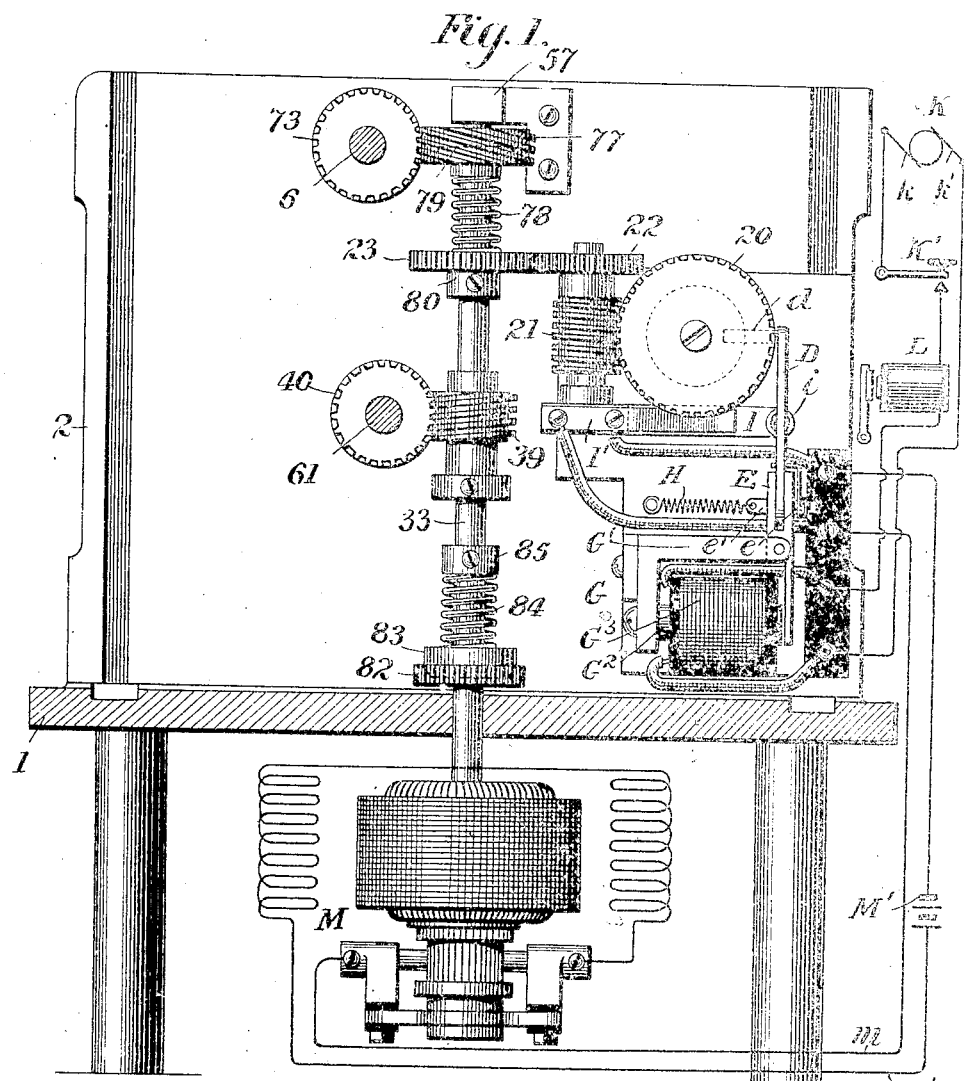
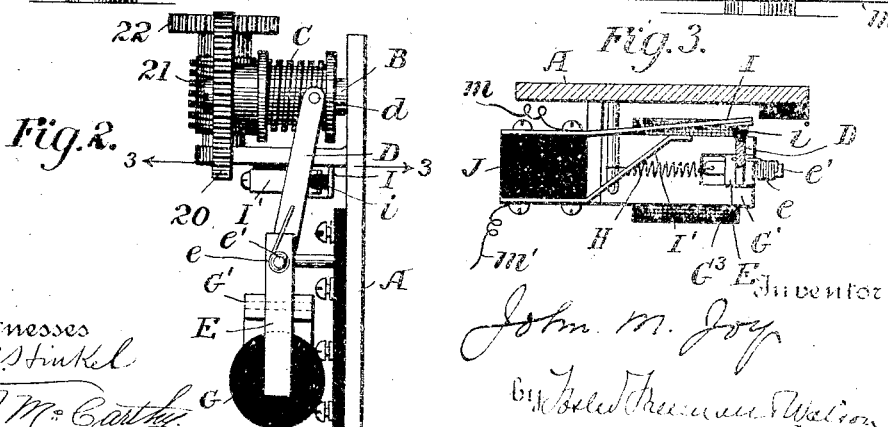

JOHN M. JOY, OF NEW YORK, N. Y., ASSIGNOR TO PAGE MACHINE COMPANY, OF NEW YORK, N. Y., A CORPORATION OF NEW YORK.

CIRCUIT-CONTROLLER FOR ELECTRIC MOTORS.

No. 876,282.        Specification of Letters Patent.        Patented Jan. 14, 1908.

Application filed March 1, 1906. Serial No. 303,676.

*To all whom it may concern:*

Be it known that I, JOHN M. JOY, a citizen of the United States, residing at New York, in the county of New York and State of New York, have invented certain new and useful Improvements in Circuit-Controllers for Electric Motors, of which the following is a specification.

My invention relates to a circuit controller for electric motors, and has for its object to provide a simple and effective means for accomplishing this purpose, and to this end my invention consists in a circuit controller embodying the general features of construction, arrangement of parts, and having the general mode of operation, substantially as hereinafter more particularly set forth.

Referring to the accompanying drawings wherein I have illustrated a preferred embodiment of my circuit controller, and shown one application thereof,—Figure 1 is an elevation of a circuit controller showing it applied to a printing telegraph, some parts of which latter are shown in elevation and some in section; Fig. 2 is a side view of the circuit controller; and Fig. 3 is a transverse section on the line 3—3 of Fig. 2.

One of the objects of my present invention is to provide an electro-magnetically operated circuit controller for electric motors which is adapted for many and various uses, and which is especially adapted for use in connection with printing telegraphs. I have shown my invention in this connection, although it will be understood that the invention can be used in other connections and relations, it being constructed and arranged by those skilled in the art to adapt it for the particular use for which it is intended.

It will be readily understood that in operating mechanism by an electric motor, it is often desirable to have some means whereby the circuit of the motor can be controlled, especially to make and break the circuit, and in many cases it is desirable to provide automatic means controlled by some operative part of the mechanism driven by the motor which shall, under certain circumstances, control the circuit of the motor driving such mechanism in accordance with the conditions or operation of the mechanism driven by the motor. This is especially desirable in printing telegraphs, and it is for that reason that I have chosen to illustrate my invention in connection with a printing telegraph mechanism.

In the present instance, I have shown my invention as connected and coöperating with a printing telegraph receiver of the general type disclosed in my Patent No. 780,664, dated January 24, 1905, and I have illustrated enough of such a telegraph receiver to show how my invention can be applied and used in connection therewith.

In the accompanying drawing, 1 is a base having an upright or standard 2 forming part of a frame supporting the operative parts of a printing telegraph receiver; and M represents an electric motor, in this instance directly connected to a shaft 33 mounted on the base and having a bearing in the bracket 57, and this may be said to constitute the main operating shaft of the telegraph receiver, from which the various parts receive motion. It is not deemed necessary to illustrate all these parts, as they are fully disclosed and described in my prior patent, but I will state that 6 will represent the type wheel shaft of that instrument on which is a worm wheel 73 meshing with a worm 77 loose upon the shaft 33, but connected to the shaft through a clutch 79, spring 78 and collar 80, while 61 may represent the type wheel carriage moving shaft, which is driven from a worm 39 on the shaft 33 meshing with a worm wheel 40. The gear wheel 82 is loose on the shaft 33 and is adapted to operate some other part of the telegraph receiver and is driven from the shaft 33 through the medium of the clutch 83, spring 84 and collar 85. These devices form no part of the present invention and are simply shown as typical of a mechanism in connection with which my circuit controller is adapted to be utilized. I will not, therefore, describe the details of construction and operation of these parts herein.

My improved controlling device comprises a base or support A, upon which are conveniently mounted the operative parts; and upon the stud B is mounted a worm wheel C which is connected to be operated by the motor, the circuit of which is to be controlled. In the present instance, connected to the worm C is a worm wheel 20 adapted to engage a worm 21 connected to a gear 22, engaging a gear 23 conveniently formed on the collar 80 of the shaft 33, whereby the circuit controller is operated from the motor M through its shaft 33 and the intermediate connections thus described. It will be understood that these intermediate connections will vary in accordance with the position and relation of the circuit controller to the motor, the circuit of which it is to control, and those described are typical only and are so arranged that the worm is driven by or from the motor through intermediate connections, preferably at a reduced speed with relation to the speed of the shaft 33 of the motor.

Coöperating with the worm C is an arm or lever D, in the present instance having a pin or projection d, the end of which is adapted to engage the worm and travel in the grooves therein and to be disengaged therefrom. This arm or lever D is shown constructed and arranged to have a universal movement with relation to the worm, and while the details of construction and arrangement may vary, I have shown the arm D as pivotally mounted in the armature lever E of the electro-magnet G. In the present instance, the armature E is pivoted in one polar extension G' of the electro-magnet, one arm of the lever extending from the other polar extension G² of the magnet, which is surrounded by the coil G³.

The armature is biased in any suitable way so as to normally maintain a certain relation to the poles of the magnet, and in the present instance, I have shown a spring H which tends to hold the armature away from the core of the magnet and to retain the pin d of the arm D in contact with the worm, but when the magnet coils G³ are energized, the armature E is rocked, lifting the arm D so that the pin d is removed from contact with the worm. The arm D is also biased with relation to the armature E by any suitable means, and I have shown a coiled spring e, one end of which is connected to the arm E, and the other of which is coiled around and secured to a stud e' mounted on the armature lever. The tendency of this spring is to keep the arm D and armature E practically in alinement and to restore the arm D to this relative position whenever it is moved therefrom by its pin d traveling in the grooves of the worm. This is accomplished by energizing the coils of the electro-magnet which attracts the armature, raising the arm D, and the spring e moves it laterally or restores it to its normal position, so that when the coils of the magnet are deënergized, it will engage the worm at or near one end of the groove thereof.

It will be understood that when the electro-magnetic device is deënergized and the motor and connected mechanism operated, the pin d travels along the grooves of the worm C, but as soon as the magnet is energized, the pin is removed from the groove and the arm D resumes its normal position.

Mounted in coöperative relation to some operative part of the circuit controller, are contacts arranged in or controlling the electric circuit of the motor, and, while these may be placed in different relations and differently constructed in detail, I have shown as mounted on an insulating block J spring arms I, I', arranged so that they are normally in contact to close the circuit of the motor, and also arranged so as to be operated to break the circuit according to the position of the arm D. In the present instance, I have shown the spring I as extending into the path of movement of the arm D, and it is preferably provided with an insulating contact projection i against which the arm D impinges in its travel under the influence of the worm C. This spring contact arm is arranged in such relation to the arm D that before the pin d reaches the end of the worm C, the arm D will impinge upon the contact arm I and break the contact between it and the contact arm I', thus interrupting the circuit of the motor M and consequently the worm when driven therefrom stops, the circuit remaining open, in the present instance, until it is closed by the electro-magnetic device operating to restore the parts to their normal position. In the present instance, as soon as the magnet G is energized, the arm D is lifted and restored to its normal position, allowing the contacts I and I' to close the circuit of the motor.

In the present instance, I have shown one arrangement of circuits, sufficient to explain the objects of my invention, it being understood, of course, that these will vary according to the particular relations of the parts in connection with which my circuit controller is used, and I have indicated the conductors m, m' as leading from the motor and including a source of power M' and connected to the contact arms I, I' respectively. I have also shown means for operating the electro-magnetic device including a separate source of power K, the conductors k, k' leading therefrom and including the coils G³ of the electro-magnet, and also including a key K' as indicative of circuit controlling mechanism in the circuit; and have also indicated that this circuit may include other operating devices, as the magnet L, arranged to operate or control the operation of some other part of the apparatus in connection with which my circuit controller is used. This may be, for instance, a printing magnet, such as is indicated at 96 in my patent before referred to.

Having thus described a preferred embodiment and adaptation of my invention, its operation will be largely understood therefrom, and the manner of utilizing it in connection with different mechanisms can be varied by those skilled in the art. Generally stated, it will be seen that in the present construction, the worm C is connected to be driven from the motor M, and that the arm D is moved by its pin $d$ engaging the grooves of the worm, and arranged within the scope of such movement are the contacts I, I', controlling the circuit of the motor, so that at a predetermined time the circuit of the motor will automatically be broken and the motor stopped unless the circuit closing device is operated to prevent such action. It will further be observed that the arm D is controlled by the electro-magnetic device G, which device is energized or deënergized preferably from a circuit or source of power different from that operating the motor, and unless this electro-magnetic device is operated within the predetermined time of the operation of the cut-out devices to restore the parts to their normal position, the motor will be stopped, but when the electro-magnetic device is operated within that predetermined time, and continuously operated within such time, the motor continues to operate.

While my circuit controller, as disclosed in the present embodiment, includes a worm and an arm coöperating therewith and an electro-magnetic device controlling their coöperation, it is evident that other mechanical embodiments of these elements may be utilized and substituted therefor, and my invention may be said to embody two members, relatively movable with respect to each other, one of the members being movable with relation to the movements of the motor which it is to control, and the relation of the two movable members being controlled by an electro-magnetic device. These members are exemplified in the present instance by the worm C which is connected to be driven with relation to the motor M, and the arm D which is movable with relation to the worm, and the operative relations of the two members, as the worm and arm, are controlled by the electro-magnetic device G, and one of these two members thus electro-magnetically controlled is arranged to control the circuit of the motor.

What I claim is,—

1. The combination with an electric motor and a circuit therefor, of a circuit controller constructed to cut out the current after a predetermined motion of the motor and comprising two members relatively movable with respect to each other one of which has motion corresponding in time to the movements of the motor, and an electro-magnetic device for controlling the relations of the two members.

2. The combination with an electric motor and a circuit therefor, of a circuit controller constructed to cut out the current after a predetermined motion of the motor and comprising two members relatively movable with relation to each other, connections between the motor and one of said members whereby said member has a motion corresponding in time to the movements of the motor, and an electro-magnetic device controlling the operative relations of the two members.

3. The combination with an electric motor and a circuit therefor, of a circuit controller constructed to cut out the current after a predetermined motion of the motor and comprising two members relatively movable with relation to each other, connections between the motor and one of said members, whereby said member has a motion corresponding in time to the movements of the motor, an electro-magnetic device controlling the operative relations of the two members, and a separate circuit including said electro-magnetic device and means for controlling said circuit.

4. The combination with an electric motor and a circuit therefor, of a rotating worm, an arm adapted to engage the worm and operating to control the circuit of the motor, and an electro-magnetic device controlling the arm and its engagement with the worm.

5. The combination with an electric motor and a circuit therefor, of a worm connected to be driven from the motor, an arm adapted to engage the worm and operating to control the circuit of the motor, an electro-magnetic device controlling the arm in its engagement with the worm, and a separate circuit including said electro-magnetic device and means for controlling the same.

6. The combination with an electric motor and a circuit therefor, of a worm connected to be driven from said motor, an arm adapted to normally engage the worm and operating to control the circuit of the motor, an electro-magnetic device arranged to disengage the arm from the worm, and a circuit including said electro-magnetic device and circuit controlling devices therefor.

7. The combination with an electric motor and a circuit therefor, of a circuit controller for controlling the circuit of the motor, comprising two members relatively movable with respect to each other, one of which is connected to be moved with relation to the movements of the motor and an electro-magnetic device controlling the relative movements of the two members, and an electric circuit including said electro-magnetic device, and means for controlling said circuit, the arrangement being such that when the electro-magnetic device is deënergized the circuit controller operates within a predetermined time to break the circuit of the motor, but when the electro-magnetic device is energized within said predetermined time it prevents the breaking of the circuit of the electric motor.

In testimony whereof I affix my signature in presence of two witnesses.

JOHN M. JOY.

Witnesses:
  FRANK L. FREEMAN,
  MILTON TIBBETTS.